J. M. WADE.
CAMERA.
APPLICATION FILED JULY 18, 1917.

1,295,395.

Patented Feb. 25, 1919.
3 SHEETS—SHEET 1.

Inventor:
James M. Wade,
by Celmyho Brown Dunlop May
Attorneys.

UNITED STATES PATENT OFFICE.

JAMES M. WADE, OF BOSTON, MASSACHUSETTS.

CAMERA.

1,295,395.

Specification of Letters Patent.  Patented Feb. 25, 1919.

Application filed July 18, 1917. Serial No. 181,247.

*To all whom it may concern:*

Be it known that I, JAMES M. WADE, a citizen of the United States, residing at Boston, in the county of Suffolk and State of Massachusetts, have invented new and useful Improvements in Cameras, of which the following is a specification.

This invention has relation to cameras of the type in which one lens is employed for photographic purposes and a separate lens is employed for ascertaining and regulating the focus.

The object of the invention is to produce a camera of the type referred to in which the image on the screen is full size as compared with that upon the film or plate in the production of the negative, *i. e.*, the area of the field projected on the screen is equal to that projected upon the sensitized surface at the moment of exposure. A further object is to provide such a camera, which, in addition, may be folded into small compass, and is simple and inexpensive in construction.

A camera embodying my invention comprises the photographic lens and its bellows, a focusing lens in fixed relation to the photographic lens but adjustable therewith, a screen arranged at an angle to the plane of the sensitized element (*i. e.*, plate or film), and a reflector arranged at such an angle as to reflect upon the screen the image of the focusing lens. The screen is so located in reference to the reflector and the focusing lens that the distance traveled by the light rays from the nodal point of said lens to the screen is equal to that traveled by the light rays from the nodal point of the photographic lens, to the sensitized element, and hence accurate adjustment of the photographic lens may be made in focusing the image on the screen, it being understood that the two lenses are of the same focal length. The screen is preferably located at the top of the camera in a plane at a right angle to the planes of the sensitized element and the lens carrier, and is of such dimensions that the entire field of the image projected thereon is equal to that projected upon the sensitized element, the focusing lens being in such case mounted on the lens carrier above the photographic lens. When the parts are all in operative position, the reflector is located in a fairly light-tight box, and the screen is substantially protected from light rays by a hood projecting thereabove.

Referring to the drawings,—

Fig. 3 illustrates, in vertical longitudinal section, the camera as in open position.

While I have already described briefly in general terms and shall hereinafter describe in detail the particular camera which I have illustrated as embodying my invention and improvements, I desire it to be understood at the outset that said camera is not the sole embodiment of which the invention is capable, but, on the contrary, that the invention may be produced in, a variety of forms and designs, and the details of construction of the illustrated camera may be greatly changed, without departing from the spirit and scope of the invention as defined in the appended claims. Moreover, the language or phraseology which I employ herein is for purposes of description and not of limitation, and that the terms "rear", "front", "side", "top", "bottom", etc., are used merely in a relative sense.

Figure 1:
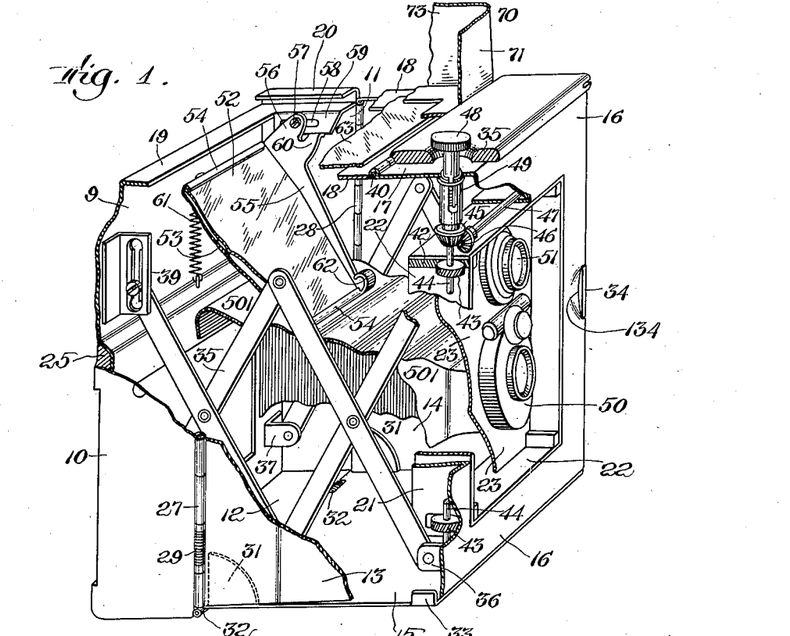
Figure 1 represents a perspective view of a camera embodying my invention, parts being broken away to illustrate the interior construction.
Figures 4, 5:
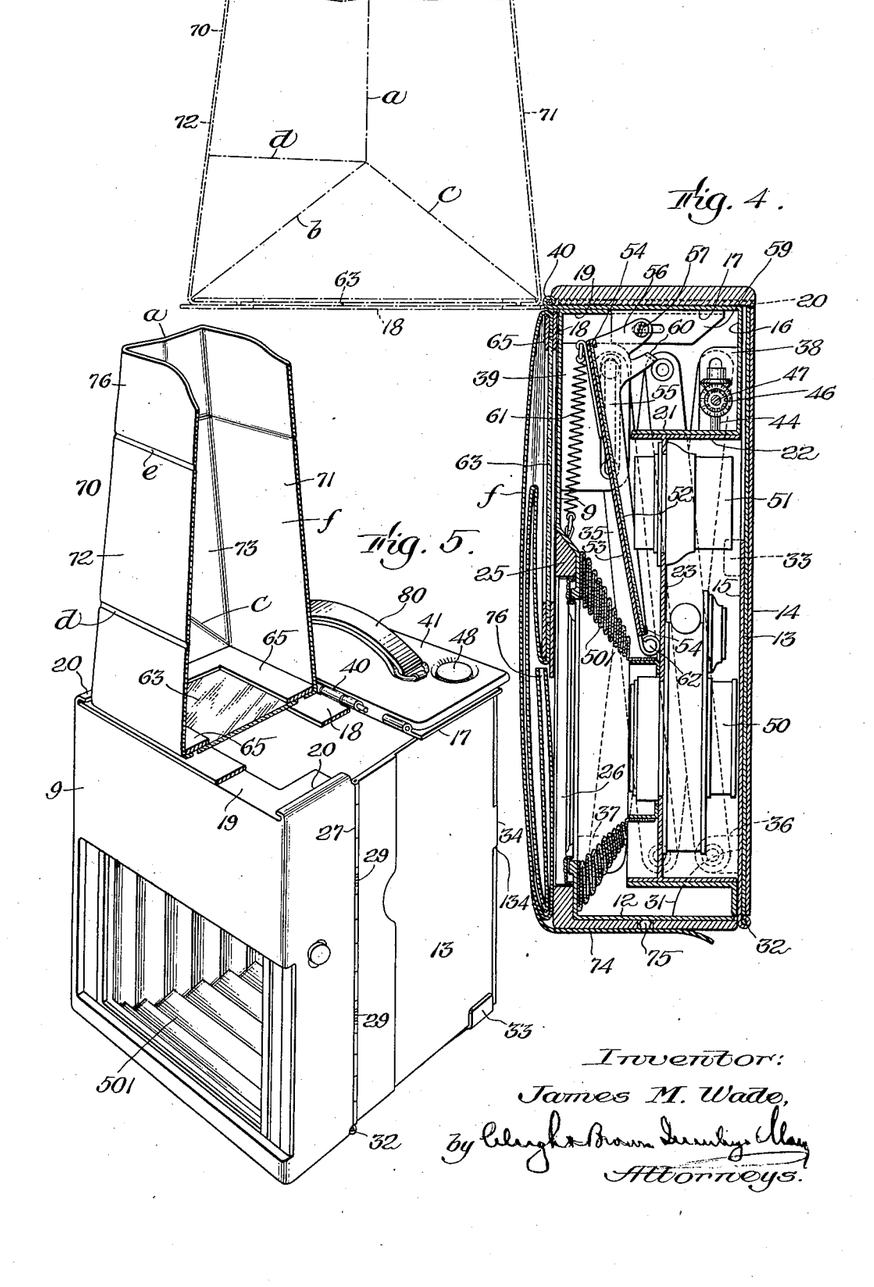
Fig. 4 is a similar view showing the camera folded, the dotted lines indicating the position of the hood just before it is closed or folded.
Fig. 5 is a perspective view of the opened camera, the hood being partially in section to disclose the screen in its operative position.

Proceeding now to a detailed description of the illustrated camera,—I employ a box which consists of a rigid portion, a foldable portion or extension, and a sliding top arranged to coöperate with both, the dimensions of the box varying with the length and breadth of the desired negative and the focal length of the lens. When closed, the box is narrow from front to rear, and, when opened, its cubical contents are approximately trebled, as will be seen by comparing Figs. 3 and 4. The box comprises the back wall 9, the side walls 10, 11, the bottom wall 12, the hinged side wings 13, 14, the bottom wing 15, the front wall 16, and the top wall, all of which may be made of sheet metal stamped and formed into proper shape and covered with leather, cloth or other like material. The top wall consists of the two hinged sections 17, 18, the section 17 being if desired integral with the front wall 16 as indicated in Fig. 1. The back and side walls have the inturned flange 19 at the upper end, and the top is arranged to slide in a guideway afforded by said flange and the inturned guides 20, 20. When in operative or extended position, the side and rear marginal portions of the top overlap the flange 19. The front is provided with a rectilinear aperture bounded by a rearwardly projecting flange 21, constituting a bed in which is seated a hollow rectilinear frame 22 with a plate 23, said frame and plate constituting the lens carrier, to which reference will be subsequently made. The box may be equipped with means for receiving any suitable sensitized element such as a roll film, or a plate holder, or a film or plate pack, as the invention is not directly concerned with this feature of the camera. As shown, however, the back of the box is constructed to accommodate a plate holder. The back wall is carried forward at its lower portion as shown in Fig. 3, and has an aperture 24 which permits the passage of light rays to the sensitized surface of the plate (not shown) and which bounds the field of the image, said aperture being square or oblong as ordinarily. A wooden or other frame 25 is secured to the back plate, so that the exterior of the rear wall will be flush, and so that the usual recess will be provided for a plate holder 26, as shown in Fig. 4. Said frame projects under the bottom of the box and adds to the thickness of the box bottom.

Figure 2:
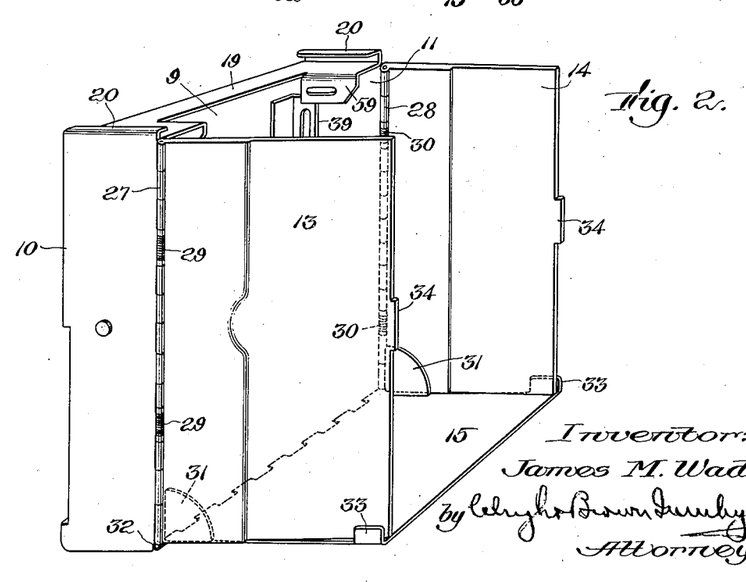
Fig. 2 illustrates, in perspective view, the extended or opened box, the sliding top having been omitted.
Figures 5, 6, 7:
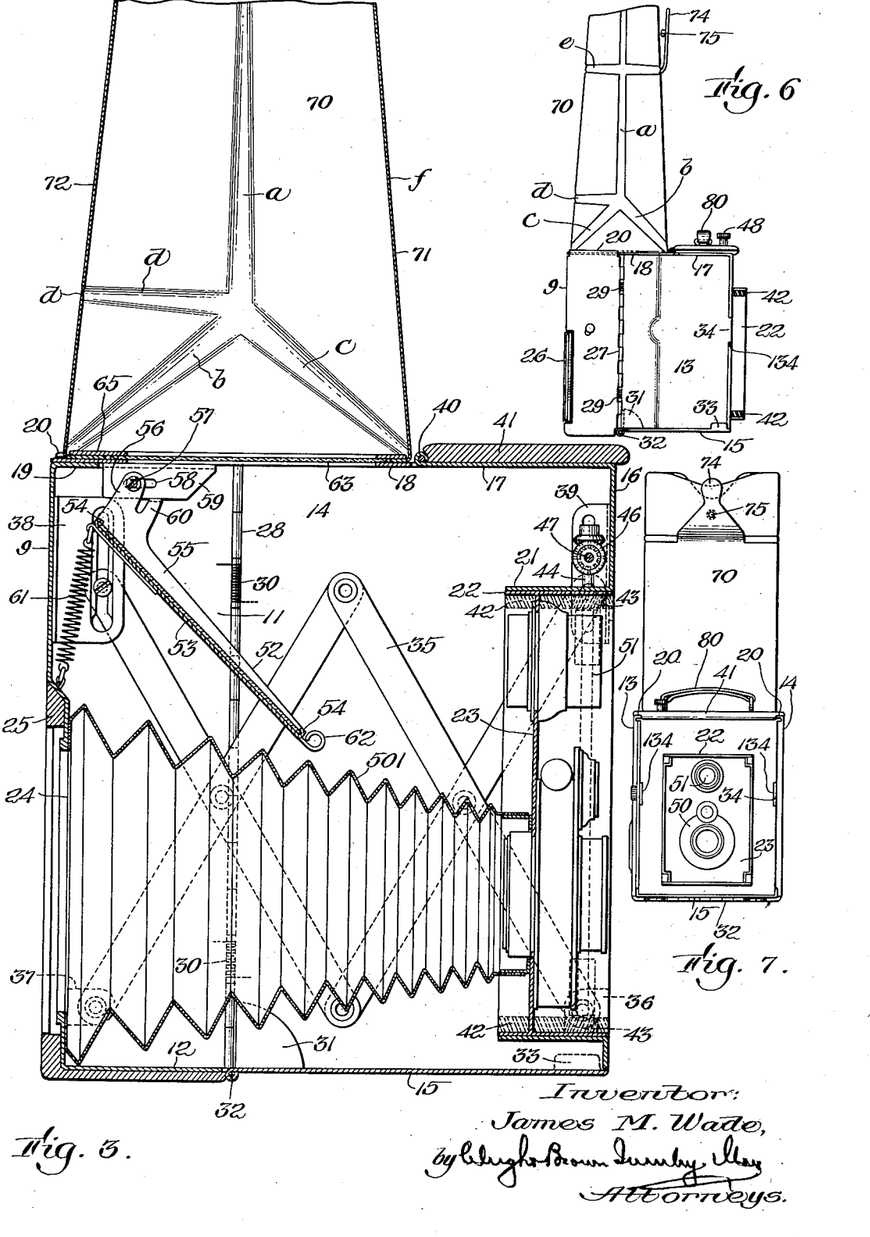
Figs. 6 and 7 (Sheet 2) are views on a small scale, showing the camera, in open position, in side and front elevations respectively.

Returning, again to the box construction, the side wings 13 and 14 are respectively hinged to the side walls 10 and 11 of the frame by hinges indicated at 27, 28, there being provided springs 29, 30, which tend to move the said wings or extensions to closed position. When they are in said closed position, the wings overlap, and, in order that the front of the box may be flat or flush, the outer end portions of the two wings which overlap are rabbeted or reduced in thickness, as best shown in Fig. 2. The said wings must be secured in their extended or open position, and for this purpose the bottom wing 15 is provided with two segmental lugs 31 near its rear end at which it is connected to the bottom plate of the box by a hinge 32. At its end near its outer edge the said bottom wing 15 is provided with two upstanding ears 33 which project upwardly and take over the lower outer corners of the side wings, 13, 14. These lugs or ears limit the outward swinging movement of the side wings, whereas the segmental ears or lugs 31 prevent the side wings from swinging to closed position. These four ears or lugs constitute stops for the purposes described. Springs 34, see Fig. 7, tend to throw the bottom wing 15 into an upright position, but, when the box is opened, the said wing is held in its open or extended position by the side wings 13, 14. The hinges are preferably so formed as to exclude light, and to this end the usual leather or cloth covering for the entire box is provided which may lie over the hinges if desired.

In opening the box, the side wings are first thrown outwardly, after which the bottom wing is swung downwardly until the ears 33 clear the lower edges of the side wings, after which the front portions of the side wings are swung inwardly or toward each other far enough to permit the ears or lugs 33 to be moved up into the position shown in Fig. 2. At their front edges, the side wings 13, 14, are provided with stops 34, 34, which snap into recesses 134 in the side edges of the front wall 16 of the box, and prevent rearward movement of said front wall, until said side wings are spread apart purposely. For holding the front wall at all times parallel to the rear wall in its various positions and during its movement away from and toward said rear wall, two lazy tongs connections are employed as indicated as a whole at 35, 35. Two of the levers of each connection are pivoted to lugs 36, 37, on the front and rear walls of the box, and two levers have studs which slide in vertical slots in lugs 38, 39, on the rear and front walls of the box.

The top of the box, as has been explained, consists of two sections 17 and 18, which are connected by a hinge 40. The section 17 is of sufficient width to overlap at its edges the front and rear walls of the box when the latter is closed, as shown in Fig. 4, and upon it is secured a relatively thick strip 41 of wood or other like material which projects beyond the front end thereof, though this refinement is unnecessary. When the top is slid rearward to its closed position, the section 18 may swing downwardly so as to lie against the exterior of the rear wall of the box, as shown in Fig. 4. This rear section of the top carries the screen and the focusing hood, as will be subsequently explained.

The lens carrier is adjusted in relation to its bed in the front wall for focusing purposes by any suitable mechanism. The rectangular frame, which constitutes a portion of the carrier, is shown as provided on each side near the upper and lower ends thereof with racks 42, the teeth of which are preferably diagonal, and which are engaged by complemental spiral gears 43, 43, on upright shafts 44. These shafts are provided with bevel gears 45 intermeshing with complemental gears 46 on a cross shaft 47 above the upper wall of the rectangular bed, as shown in Fig. 1. The depressible focusing button 48 is inserted in a sleeve 49 secured to the shaft 44. On rotating the button 48, the lens carrier is adjusted accurately longitudinally of its bed. In the plate 23 of the lens carrier is mounted the photographic lens which, together with its adjuncts, is indicated as a whole at 50. The bellows for the photographic lens is indicated at 501 and extends from the lens carrier to the rear or back of the box as ordinarily.

I have stated that the top of the box contains a screen and have stated that this screen is of the same dimensions as the aperture 24 at the back of the box through which the image is projected from the photographic lens. Upon this screen is projected the image to be photographed from a focusing lens, which is indicated as a whole at 51, and which is supported by the lens carrier immediately above the photographic lens 50. The light rays from the focusing lens are reflected to the screen by a folding reflector, which, when the camera is opened, occupies a position at an angle of approximately 45° to the plane of the lens and to the plane of the screen. The reflector is indicated at 52 and it consists of a mirror which is supported in a metallic reflector holder indicated as a whole at 53. The reflector holder consists of a plate having its upper and lower marginal portions inturned as at 54 so as to take over the upper and lower marginal portions of the mirror. At what may be termed the sides of the reflector holder there are flanges 55 which near their upper ends are provided with ears 56 through which pivots 57 are passed through apertures or slots 58 in brackets 59 extending downwardly from the side portions of the flange 19. The slots 58 afford means for permitting the adjustment of the reflector holder toward and from the rear wall of the box, the pivots 57 being secured in place after adjustment. The reflector holder is also provided with stops 60, which, when the reflector has been moved to the proper angle, engage the edges of the brackets 59, as shown in Figs. 1 and 3. One or more coiled springs 61 are utilized to move the reflector holder automatically to operative position when the camera is extended, each such spring being connected at one end to the upper edge of the reflector holder and at its lower end to the rear wall of the camera. When the camera is extended, the reflector is held in its operative position by the springs so as to reflect the image from the focusing lens upon the screen.

When the camera is being closed, the plate 23 of the lens carrier engages the lower end of the reflector holder and thrusts it rearwardly to the position shown in Fig. 4. To prevent the parts from being scratched or injured, the reflector holder is provided at the sides of its lower end portion with curved tongues or buttons 62 for engagement with the wall 23 of the lens carrier.

The screen, which is made of ground glass, is indicated at 63, and it is secured in a frame formed in part by the rear section 18 of the sliding top. Said section is provided with a rectangular aperture, the walls of which are overlapped by the margins of the screen, and the screen is held thereon by a supplemental rectangular frame 65, which, as subsequently will be explained, also secures the lower end of the hood to the said section 18. The uncovered portion of the screen is equal in dimensions to the aperture 24 in the rear wall of the plate through which the image is projected by the photographic lens. When the top is slid to the rear to fold the box, the screen hangs in the rear of the rear wall of the box, as shown in Fig. 4. When the box is opened and the top and front thereof are slid forwardly into the position shown in Fig. 3, the reflector holder swings forwardly under the tension of the spring or springs 61, and finally, (when the stops 60 engage the brackets 59) occupies an angular position so as to reflect the image projected by the focusing lens upon the screen 63. The box, when it is opened, is fairly though not actually light-tight, and consequently I need no supplemental bellows for use in connection with the focusing lens.

A focusing hood is employed which consists in part of semi-flexible material so as to fold when not in use. I may employ leather for this purpose, the walls of the hood where the folds do not occur being, if desired, reinforced by a relatively stiff material such as card-board. The hood as a whole is indicated at 70 and it is secured to and moves with the section 18 of the sliding top wall of the box. The lower end margins of the walls of the hood are inturned and are clamped upon the top section 18 by the rectangular frame 65. The inturned edge portions of the hood lie in the plane of the screen and serve to prevent lateral dislocation thereof. The front wall 71, the rear wall 72 and the side walls 73 of the hood are scored or weakened or rendered more flexible so that the sides 73 may be folded inwardly on the lines $a$ $b$ $c$, the entire hood bent downwardly on the line $d$, and the end folded under on the line $e$, so that the hood lies flat against the rear wall of the camera, as indicated in Fig. 4. Preferably the front wall 71 is provided with a section $f$ which is reinforced with cardboard or other relatively stiff material and which forms the rear protecting wall of the camera when it is closed. To the portion f of the wall 71 is secured a flap 74 having a hook or button 75 for engagement with a socket or aperture in the bottom of the rigid portion of the box so that the hood may be secured in its folded position. Considered as a whole, the upper extremity of the hood is folded down and under as indicated at 76, Fig. 4, so as to cover a portion of the plate holder, in the event that a plate holder is employed. The ends of the front and rear walls of the hood are shaped to fit the forehead and middle portion of the face, so that the observer may close the open end of the hood and shut out the light in focusing the camera. The usual carrying handle or strap 80 is attached to the section 17 of the top.

Assuming the camera to be closed, as illustrated in Fig. 4, it is opened as follows: The button or catch 75 on the flap 74 is released, side wings 13, 14, are opened, the bottom wing 15 is swung down to horizontal position, and the side wings 13, 14, are secured in place between the lugs 31, 33, of the bottom section in the manner hereinbefore described. The rear section of the top, carrying the hood and the screen, is moved to a horizontal position, as indicated in dotted lines in Fig. 4, and the top and front are moved forwardly until the front wall 16 reaches its extreme front position, at which time the lugs 34, 34, snap into recesses 134, 134. As the front wall and the lens carrier move forwardly, they are followed by the lower end of the swinging reflector which swings forwardly and upwardly under the tension of the spring or springs 61. The focusing hood is unfolded and extended into the position shown in Fig. 6, and the camera is then ready to be focused with accuracy, this latter being accomplished by rotating the focusing button 48 so as to adjust the lens carrier forwardly or rearwardly.

I have not herein described a shutter mechanism, as I may employ a focal plane or other type of shutter as may be desired, this feature of the camera not being involved in the present invention.

A camera, such as herein described, possesses numerous features of advantage, one of which is that the reflector moves automatically to operative position when the camera is opened and there remains during the time of and after the operation of the shutter, that is, during the taking of a picture. When the camera is closed, the reflector is automatically moved to an inactive position. It is not necessary that the box when opened should actually be light-tight, since sufficient light is excluded to enable the observer to see the image projected on the screen with sufficient clearness. Another decided advantage, which is secured by the construction which I have described, is that the camera may be folded into very compact form, and, when so folded, the screen is protected and covered by the hood and the lenses are protected and covered by the folding wings of the box. These are but a few of the many advantages, incident to the hereinbefore described camera, which will be readily appreciated by those familiar with the art.

The lens carrier, the top, and the screen are all connected and movable together into and out of active position, and their movement to active position likewise controls the movement of the reflector to active position; hence said parts all move simultaneously to their operative positions, although the reflector reaches its active position and there remains before the movement of the top, the screen and the lens carrier ceases. The sliding top also constitutes a slidable folding screen carrier, which is movable into and out of operative position.

Having thus explained the nature of my said invention and described a way of making and using the same, although without attempting to set forth all of the forms in which it may be made or all of the modes of its use, what I claim is:

1. A camera comprising a box, a photographic lens, a focusing lens, a carrier for said lenses movable from open to closed position and vice versa, a screen, a movably supported reflector, a spring by which said reflector is moved automatically into operative relation to the focusing lens when the lens carrier is moved to open position, and a stop on the box for positioning said reflector, against which said reflector is pressed by the spring.

2. A camera comprising a photographic lens, a focusing lens, a movable focusing screen, a movable reflector, said screen and said reflector being normally in inactive position, and means for moving said screen and said reflector to active position.

3. A camera comprising a photographic lens, a focusing lens, a reflector for reflecting the image projected by the focusing lens, a screen on which the image may be reflected, and means for moving said screen into and out of active positions.

4. A folding camera comprising a photographic lens, a focusing lens, a screen, a reflector for reflecting upon the screen the image projected by the focusing lens, a folding box, and means by which the screen is moved into and out of active position as the box is opened or closed.

5. A camera comprising a photographic lens, a focusing lens, a screen, a reflector arranged to reflect upon said screen the image projected by said focusing lens, and a foldable box inclosing said reflector and having a sliding top wall on which said screen is mounted.

6. A camera comprising a photographic lens, a focusing lens, a movably supported reflector adapted to reflect the image projected by said focusing lens, a screen equal in area to the projected area of the photographic lens upon the surface of the sensitized element, a folding box inclosing said reflector and practically excluding light therefrom when the box is open, and means by which said reflector is movable to inactive position when the box is closed or folded.

7. A camera comprising a photographic lens, a focusing lens, a movably supported reflector adapted to reflect the image projected by said focusing lens, a screen equal in area to the projected area of the photographic lens upon the surface of the sensitized element, a folding box inclosing said reflector and having a front wall movable to open position, means by which the reflector is moved into operative relation to the screen when the front wall is moved to open position, and positive stop devices for accurately positioning said reflector in said operative relation and against which said reflector is pressed by said means.

8. A camera comprising a photographic lens, a focusing lens, a movably supported reflector adapted to reflect the image projected by said focusing lens and adapted to be swung about a pivot, a screen, a folding box inclosing said reflector when in open position and having a front wall movable toward and from the back wall, a spring by which, when the front wall is moved to open position, the reflector is moved about its pivot to operative position in relation to said screen, and positive stop devices for accurately positioning said reflector in said operative relation and against which the reflector is pressed by said spring.

9. A camera comprising a photographic lens, a focusing lens, a movably supported reflector adapted to reflect the image projected by said focusing lens, an extension or folding box having a movable screen on its top and a movable front wall, and means by which, when the front wall is moved to open position, the reflector is moved to active position in relation to the focusing lens and the screen.

10. A camera comprising a folding box provided with a movable front wall, a photographic lens and a focusing lens both supported by said front wall, a reflector pivotally supported in said box, a movably supported screen connected to said front wall, and means by which, when said front wall is moved to extended position, said reflector and said screen are moved to operative position in relation to said focusing lens.

11. A camera comprising a folding box having a slidable top formed in hinged sections of which the rear section may fold in rear of the back of the box when the box is closed, a front wall movable toward and from the back of the box to open and closed position, a photographic lens and a focusing lens both supported on said front wall, a bellows for the photographic lens, a reflector arranged within said box, and a screen supported on the rear section of said slidable top and movable therewith into operative position.

12. A camera comprising a photographic lens and its bellows, a focusing lens, a reflector, a foldable box inclosing said bellows and said reflector, said box including a movable front wall supporting both said lenses and a slidable top, and a screen supported by said slidable top.

13. A camera comprising a box consisting in part of a back wall, a parallel front wall movable toward and from the rear wall to closed and open position, and a slidable top having a hinged rear section adapted to fold in rear of the back wall when said box is closed; a photographic lens and a focusing lens supported on said front wall; a bellows in the box for the photographic lens; a screen carried by said rear hinged section of the top; and a reflector in said box.

14. A camera comprising a box consisting in part of a back wall, a parallel front wall movable toward and from the rear wall to closed and open position, and a slidable top having a hinged rear section adapted to fold in rear of the back wall when said box is closed; a photographic lens and a focusing lens supported on said front wall; a bellows in the box for the photographic lens; a screen carried by said rear hinged section of the top; and a spring-tensioned reflector pivotally supported within said box and movable by said front wall into inactive position when said box is closed.

15. A camera comprising a box consisting in part of a back wall, a parallel front wall movable toward and from the rear wall to closed and open position, and a slidable top having a hinged rear section adapted to fold in rear of the back wall when said box is closed; a photographic lens and a focusing lens supported on said front wall; a bellows in the box for the photographic lens; a screen carried by said rear hinged section of the top; a reflector pivoted at its upper end in said box in the rear of the focusing lens; a spring connected to said reflector for swinging the lower end of said reflector forwardly to inclined operative position, and means on said front wall for swinging said reflector rearwardly to inoperative position when said front wall is moved to closed position.

16. A camera comprising a box consisting in part of a back wall, a parallel front wall movable toward and from the rear wall to closed and open position, and a slidable top having a hinged rear section adapted to fold in rear of the back wall when said box is closed; a photographic lens and a focusing lens supported on said front wall; a bellows in the box for the photographic lens; a screen carried by said rear hinged section of the top; a reflector in said box; and a focusing hood attached to said hinged rear section of the top.

17. A camera comprising a box consisting of a back, a bottom, and two side walls all in fixed relation, hinged side and bottom wings or extensions adapted to fold across the front of the box, a front wall movable toward and from the back wall, and a top slidable on said side walls and having a hinged section adapted to fold in the rear of the back wall.

18. A camera comprising a box, consisting of a back, a bottom, and two side walls all in fixed relation, hinged side and bottom wings or extensions adapted to fold across the front of the box, a front wall movable toward and from the back wall, and a top slidable on said side walls and having a hinged section adapted to fold in the rear of the back wall; in combination with a photographic lens and a focusing lens supported by said front wall, a bellows for the photographic lens, a screen carried by the rear section of the top, and a reflector in said box.

19. A camera comprising a box, consisting of a back, a bottom, and two side walls all in fixed relation, hinged side and bottom wings or extensions adapted to fold across the front of the box, a front wall movable toward and from the back wall, and a top slidable on said side walls and having a hinged section adapted to fold in the rear of the back wall; in combination with a photographic lens and a focusing lens supported by said front wall, a bellows for the photographic lens, a screen carried by the rear section of the top, and a reflector pivotally mounted within the fixed portion of the box and adapted to be moved to an angular position in reference to the screen and the focusing lens.

20. A camera comprising a box, consisting of a back, a bottom, and two side walls all in fixed relation, hinged side and bottom wings or extensions adapted to fold across the front of the box, a front wall movable toward and from the back wall, and a top slidable on said side walls and having a hinged section adapted to fold in the rear of the back wall; in combination with a photographic lens and a focusing lens supported by said front wall, a bellows for the photographic lens, a screen carried by the rear section of the top, a reflector in said box, and a foldable focusing hood affixed to the said rear top section in operative relation to the screen.

21. A camera comprising a box, consisting of a back, a bottom, and two side walls all in fixed relation, hinged side and bottom wings or extensions adapted to fold across the front of the box, and a top slidable on said walls and having a hinged section adapted to fold in the rear of the back wall; in combination with a photographic lens and a focusing lens supported by said front wall, a bellows for the photographic lens, a screen carried by the rear section of the top, a reflector pivotally supported at its upper end above said bellows upon the fixed portion of said box to hang pendant, a spring for swinging said reflector to an angular position in reference to the screen and the focusing lens, and stops for determining the angular position of said reflector.

22. A camera comprising a box consisting in part of a back wall, a movable front wall, extensible connections between said walls, and a top formed of hinged sections of which the forward section is connected to the front wall, and the rear section is adapted both to slide on the back wall and to fold in the rear thereof.

23. A camera comprising a box consisting in part of a back wall, a movable front wall, extensible connections between said walls, and a top formed of hinged sections of which the forward section is connected to the front wall, and the rear section is adapted both to slide on the back wall and to fold in the rear thereof, in combination with a lens carrier slidably mounted on said front wall, and means for adjusting said carrier relatively to said front wall.

24. A camera comprising a box consisting in part of a back wall, a movable front wall, extensible connections between said walls, and a top formed of hinged sections of which the forward section is connected to the front wall, and the rear section is adapted both to slide on the back wall and to fold in the rear thereof, in combination with a lens carrier slidably mounted on said front wall, a focusing button, and means connected with said button for adjusting said lens carrier in reference to said front wall.

25. A camera comprising a rigid box having movable side and bottom extensions, a sliding top having a rear folding section, and a front wall; a slidable lens carrier bedded on said front wall, a photographic lens and a focusing lens both supported on said carrier, a bellows for the photographic lens, a screen supported by a section of the top, and a folding reflector in said box for reflecting the image projected by the focusing lens upon the screen.

26. A camera comprising a rigid box having movable side and bottom extensions, a sliding top having a rear folding section, and a front wall; a slidable lens carrier bedded on said front wall, a photographic lens and a focusing lens both supported on said carrier, a bellows for the photographic lens, a screen supported by a section of the top, and a folding reflector in said box for reflecting the image projected by the focusing lens upon the screen, the said lenses being of the same focal length, and all the parts being so related that, when they are in open operative position, the distance traveled by the light rays from the photographic lens to the surface of the sensitized element is equal to that traveled by the light rays from the focusing lens to the said screen.

27. A folding camera comprising a focusing lens and a photographic lens of the same focal lengths and simultaneously adjustable toward and from the sensitized element, a screen substantially equal in area to the exposed area of the sensitized element, and a foldable reflector, said parts being so related that, when the camera is unfolded, the distance traveled by the light rays from the photographic lens to the surface of said sensitized element is equal to that traveled by the light rays from the focusing lens to the screen.

28. A folding camera comprising a focusing lens and a photographic lens of the same focal lengths and simultaneously adjustable toward and from the sensitized element, a bellows for the photographic lens, a foldable screen substantially equal in area to the exposed area of the sensitized element, a foldable reflector, and a foldable box or case, the parts being so related that, when the camera is unfolded, the distance traveled by the light rays from the photographic lens to the surface of said sensitized element is equal to that traveled by the light rays from the focusing lens to the screen.

29. A camera comprising a back wall, a movable front wall, a focusing lens and photographic lens both supported by said front wall, a bellows for the photographic lens between the front and the back walls, said back wall having an aperture of predetermined size for the passage of light rays from the photographic lens, a foldable screen equal in area to said aperture, and a foldable reflector adapted to reflect the image projected by said focusing lens upon said screen, when the parts are in open and operative position.

30. A camera comprising a back wall, a front wall in parallelism with and movable toward and from said back wall, a photographic lens and a focusing lens supported by said front wall, a foldable reflector adapted when in operative position to reflect the image projected by the focusing lens, a movably supported screen adapted, when in operative position, to receive said reflected image, a bellows for the photographic lens, and foldable sides, bottom and top walls adapted with said front and rear walls to form a folding box inclosing said bellows and said reflector.

31. A camera comprising a box consisting of side, bottom, back and front walls, and a sliding top wall; a screen supported by said top wall; a lens; and a reflector in said box for reflecting to said screen the image projected by said lens.

32. A camera comprising a box consisting of a back, a bottom and side walls in fixed relation, a front wall, extensible connections between the front and the back walls, a slidable top wall connected to said front wall and having a hinged rear section adapted to form a portion of the opened box and to lie in rear of the back wall when the box is closed, bottom and side wings, spring hinges connecting said wings with the fixed bottom and side walls for permitting said wings to fold across the front wall when the latter is retracted, and stops for locking the side and bottom wings in open position.

33. A camera comprising a box consisting of a back, a bottom and side walls in fixed relation, a front wall, extensible connections between the front and the back walls, a slidable top wall connected to said front wall and having a hinged rear section adapted to form a portion of the opened box and to lie in rear of the back wall when the box is closed, bottom and side wings, spring hinges connecting said wings with the fixed bottom and side walls for permitting said wings to fold across the front wall when the latter is retracted, and means for interlocking the side wings and the front wall in open position.

34. A camera comprising a box consisting of a back, a bottom and side walls in fixed relation, a front wall, extensible connections between the front and the back walls, a slidable top wall connected to said front wall and having a hinged rear section adapted to form a portion of the opened box and to lie in rear of the back wall when the box is closed, bottom and side wings, spring hinges connecting said wings with the fixed bottom and side walls for permitting said wings to fold across the front wall when the latter is retracted, in combination with a focusing lens supported by said front wall, a reflector in said box, and a screen disposed in visible position in operative relation to the reflector when the box is opened.

35. A camera comprising a box consisting of a back, a bottom and side walls in fixed relation, a front wall, extensible connections between the front and the back walls, a slidable top wall connected to said front wall and having a hinged rear section adapted to form a portion of the opened box and to lie in rear of the back wall when the box is closed, bottom and side wings, spring hinges connecting said wings with the fixed bottom and side walls for permitting said wings to fold across the front wall when the latter is retracted, in combination with a focusing lens on said front wall, a screen carried by the top wall, a foldable focusing hood on the exterior of said top wall in operative relation to said screen, and a reflector located in said box.

36. A camera comprising a box consisting of a back, a bottom and side walls in fixed relation, a front wall, extensible connections between the front and the back walls, a slidable top wall connected to said front wall and having a hinged rear section adapted to form a portion of the opened box and to lie in rear of the back wall when the box is closed, bottom and side wings, spring hinges connecting said wings with the fixed bottom and side walls for permitting said wings to fold across the front wall when the latter is retracted, in combination with a photographic lens and a focusing lens, a carrier for both of said lenses adjustably bedded in said front wall, a bellows for the photographic lens between said lens carrier and the back wall, a foldable reflector in said box for reflecting the image projected by said focusing lens, and a screen mounted on the hinged section of the top for receiving the image reflected by said reflector.

37. A camera comprising a box having back, side and bottom walls in fixed relation, a movable front wall, side and bottom extensions or wings hinged to said fixed side and bottom walls, and adapted to fold across said front wall when the latter is in retracted closed position, a top in sliding relation to said fixed side and back walls and adapted, when the front wall is extended, to close the upper portion of the box and having a hinged rear section to fold behind the back wall when the box is closed.

38. A camera comprising a box having back, side and bottom walls in fixed relation, a movable front wall, side and bottom extensions or wings hinged to said fixed side and bottom walls, and adapted to fold across said front wall when the latter is in retracted closed position, a top in sliding relation to said fixed side and back walls and adapted, when the front wall is extended, to close the upper portion of the box and having a hinged rear section to fold behind the back wall when the box is closed, in combination with a focusing lens and a photographic lens both supported by the front wall, a screen affixed to the hinged section of the top, a reflector supported by the fixed walls of said box, and a focusing hood affixed to said hinged section of the top in operative relation to said screen and foldable upon said screen.

39. A camera comprising a box having back, side and bottom walls in fixed relation, a movable front wall, side and bottom extensions or wings hinged to said fixed side and bottom walls, and adapted to fold across said front wall when the latter is in retracted closed position, a top in sliding relation to said fixed side and back walls and adapted, when the front wall is extended, to close the upper portion of the box and having a hinged rear section to fold behind the back wall when the box is closed, in combination with a focusing lens and a photographic lens both supported by the front wall, a screen affixed to the hinged section of the top, a reflector supported by the fixed walls of said box, a focusing hood affixed to said hinged section of the top in operative relation to said screen and foldable upon said screen, and a flap having a fastener for securing said hood in folded condition in rear of the back wall.

40. A camera comprising a photographic lens and a focusing lens of the same focal length, a lens carrier supporting said lenses in the same nodal plane, a back wall parallel with the same plane and having an aperture of given area for the passage of the projected image from said photographic lens to the sensitized surface of the negative, a foldable reflector, a screen equal in shape and area to said aperture and so arranged in reference to said nodal plane when the parts are in operative position that the distance between the nodal point of the photographic lens and the sensitized surface of the negative is equal to the sides of the angle of reflection from the nodal point of the focusing lens and the screen to the reflector, a bellows for the photographic lens between the lens carrier and the back wall, and folding walls which, with the said front and back walls, constitute a folding box for inclosing said reflector and said bellows.

41. A camera comprising a back wall, a movable front wall, a top wall attached to said front wall and slidable in reference to the back wall and having a hinged section adapted, when said front wall is extended, to form a portion of the top of the box, and, when said front wall is retracted, to lie in rear of said back wall, said section being apertured, a screen covering said aperture, and a foldable hood having its bases secured to said top section around said aperture.

42. A camera comprising a back wall, a movable front wall, a top wall attached to said front wall and slidable in reference to the back wall and having a hinged section adapted, when said front wall is extended, to form a portion of the top of the box, and, when said front wall is retracted, to lie in rear of said back wall, said section being apertured, a screen covering said aperture, and a foldable hood having its base secured to said top section around said aperture, all in combination with folding side and bottom walls which, when in extended or open position, constitute with said back, front and top walls a rectangular foldable box, a photographic lens and a focusing lens both supported by said front wall, a movably supported reflector within said box, and a bellows for the photographic lens.

In testimony whereof I have affixed my signature.

JAMES M. WADE.